US006254764B1

(12) United States Patent
Babington et al.

(10) Patent No.: US 6,254,764 B1
(45) Date of Patent: *Jul. 3, 2001

(54) METHOD FOR DISSOCIATING MATERIALS

(75) Inventors: Peter D. Babington, Ontario (CA); Daniel T. Green, Erie, MI (US); Maurice Laforet, Ontario (CA)

(73) Assignee: E/P Technologies, Windsor (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/227,337

(22) Filed: Jan. 8, 1999

Related U.S. Application Data

(62) Division of application No. 08/743,806, filed on Nov. 5, 1996, now Pat. No. 5,868,919.

(51) Int. Cl.$^7$ .................................................... C25B 3/00
(52) U.S. Cl. ............................ 205/688; 205/701; 422/44; 422/127; 426/237; 426/238; 426/240; 588/204; 47/1.3
(58) Field of Search .................................. 205/688, 701; 47/1.3; 588/204; 422/44, 127; 426/237, 238, 240

(56) References Cited

U.S. PATENT DOCUMENTS

| 3,919,064 | 11/1975 | Lowther . | |
|---|---|---|---|
| 4,817,331 | 4/1989 | Podsiadly . | |
| 4,917,785 | 4/1990 | Juvan ................................... | 204/164 |
| 5,117,579 | 6/1992 | Tellefson . | |
| 5,464,456 | 11/1995 | Kertz . | |
| 5,464,513 | 11/1995 | Goriachev et al. . | |
| 5,490,973 | 2/1996 | Grothaus et al. . | |
| 5,630,915 | 5/1997 | Greene et al. . | |
| 5,740,627 | 4/1998 | Levengood et al. . | |
| 5,868,919 | * 2/1999 | Babington et al. ................... | 205/688 |

FOREIGN PATENT DOCUMENTS

| 3618412 | 5/1986 | (DE) . |
|---|---|---|
| 4440813 | 11/1994 | (DE) . |
| WO 87/07248 | 12/1987 | (WO) . |
| WO 96/32175 | 10/1996 | (WO) . |

OTHER PUBLICATIONS

A Legros et al., "Electrophysical Treatment of Swimming Pool Waters", Chemical Abstract No. 105(16):1.39316n, 1986 (No Month) (Abstract Only.

V. Shishkin et al., "Corrosion Inhibibitor for Inner Surfaces of Pipelines", Chemical Abstract No. 105(26):230806h, 1986 (Abstract Only) No Month.

V. Yu Derqunov et al., "Electrohydraulic Pulsed Crusing of Glass–Manufacturing Wastes", Chemical Abstract No. 112(16):1442L9q, 1989, No Month.

L.A. Zhekul et al., "Electrohydraulic Method for Crushing of Refractories", Chemical Abstract No. 110(2):12319p, 1988, No Month.

Christian H.A. Juvan, "Liquid Processing System Involving High–Energy Discharge", Chemical Abstract No. 113(4):26074d, 1990, No Month.

(List continued on next page.)

Primary Examiner—Arun S. Phasge
(74) Attorney, Agent, or Firm—Clark & Brody

(57) ABSTRACT

An apparatus and method of use for dissociating materials includes a power supply, high energy capacitor, high energy trigger device and an probe and reactor arrangement for treating both solid and medium/media materials. A near instantaneous discharge of the electrical charge stored in the capacitor via the probe can be used to dissociate the material, either medium/media or solid, for a desired result. Hazardous materials can be treated to be rendered non-hazardous, rocks or other solid material can be treated for reduction in size, plant seeds can be treated to enhance plant growth surfaces of granular material can be scored or thermally polished and milk, juices and blood could be treated for sterilization.

12 Claims, 7 Drawing Sheets

OTHER PUBLICATIONS

V.S. Alekseev et al., "Discharger for Combined Electrohydraulic and Reagent Restoratin of Wells", Chemical Abstract No. 98(14):113474z, 1981, No Month.

O. Kuroda et al., "Characteristics of Flow and Mass Transfer Rate in an Electrodialyzer Compartment Including Spacer", Chemical Abstract No. 99(4):27708t, 1983, No Month.

a. Legros et al., Swimming Pool Water Treatment by Electrophysical Process, Tech. Sci, Methodes, vol. 81, No. 6, pp. 301–306, 1986, No Month.

V. Yu Derqunov et al., Electrohydraulic Pulsed Crushing of Glass–Manufacturing Wastes, Chemical Abstract No. 112(16):1442L9q, 1989, (Abstract Only) No Month.

M.G. Kantor et al., "Removal of Formaldehyde and Synthetic Fatty Acids From Industrial Waste Waters Discharge Current Impulses", Chemical Abstract No. 70(6):22743s, 1968, (Abstract Only) No Month.

* cited by examiner

METHOD FOR DISSOCIATING MATERIALS

This application is a divisional application claiming priority under 35 U.S.C. §120 based on application Ser. No. 08/743,806, filed Nov. 5, 1996 now U.S. Pat. No. 5,868,919.

FIELD OF THE INVENTION

The present invention is directed to a method and apparatus for dissociating materials and, in particular, subjecting a given material to a high energy electrical dissociation using corona pulse discharge for such applications as conversion of hazardous material to non-hazardous material, rock crushing, treating milk, juices and/or blood fluids, enhancing yields of crops and the like.

BACKGROUND ART

The use of high energy electrical discharges to treat liquids or solid materials is known. U.S. Pat. No. 4,917,785 to Juvan discloses a complicated liquid processing system involving high-energy discharge. This system has a firing chamber especially configured to attenuate shock waves and includes hydraulic shock absorbers and a complicated cooling arrangement for the electrodes. This patent is also limited to treating process liquids such as waste, sewage waters, geothermal brines, etc.

In view of the complex nature of the prior art devices utilizing high energy discharge for material treatment, a need has developed to provide simpler apparatus for treating liquids and solids with high energy electrical discharge as well as the capability of treating other materials than that previously done in the prior art.

The present invention overcomes the disadvantages noted in the prior art above by providing a simple but effective apparatus for disassociating both solids and liquids for the purposes of improving plant yields, converting hazardous materials to non-hazardous materials, crushing rock, treating medium/medias such as blood and milk and the like. One method employed is the use of high voltage, low amperage corona pulse capable of producing 360 joules within an in-line work fixture.

SUMMARY OF THE INVENTION

Accordingly, it is a first object of the present invention to provide an improved apparatus for treating solid and liquid materials using high energy electrical discharge.

Another object of the present invention is to provide a method for dissociating a material for environmental benefits, medical treatment, enhancement of crop growing, improved paper making, rock crushing, milk sterilization, gravel surface treatment, precious metal recovery from gangue, rice husk treatment and treatment of trash or waste material such as garbage.

Other objects and advantages of the present invention will become apparent as a description thereof proceeds.

In satisfaction of the foregoing objects and advantages, the present invention, in one embodiment, provides an apparatus for disassociating a material comprising a power supply, a capacitor for storing an electrical charge supplied by the power supply, a trigger switch for instantaneously discharging the electrical charge stored in the capacitor, at least one probe, one end connected to the trigger switch for receiving the electrical discharge, the other end being free to release the charge from the capacitor. A reactor, preferably with a medium/media therein is provided with the free end of the probe disposed in the reactor so that the material for dissociation is subjected to the released electrical charge.

The reactor can be either closed, open topped or be configured to have a closed inlet and outlet for either medium/media or material flow.

The trigger switch can be configured to release the stored energy in as short a time as about a nanosecond or greater. The capacitor should be designed to release up to 100 kilovolts in the nearly instantaneous discharge time. A ground switch can also be employed to prevent unwanted discharges.

More than one probe can be used and the electrical discharge can be repeated on a given material depending on the desired treatment. The reactor can also have a material handler to provide a continuous treatment apparatus. Additional material handling and recovery systems can be provided in conjunction with the reactor.

In the method aspect of the invention, a selected material is disassociated by subjecting it to a cycle shock front which is formed by the instantaneous release of the electrical charge contained in the capacitor. Depending on the material to be treated and the type of dissociation, either at least one of the disassociated product, a media, if used, or a material remainder is recovered. Preferably, the apparatus described above is used to subject the material to the cycle shock front.

The dissociation caused by the energy of the electrical discharge can break up the material treated into simpler constituents or modify its make up depending on the material treated. For example, seed such as corn, soya and wheat can be treated to accelerate growing and increase the crop harvest. Other materials for use in the invention include treating paper pulp to whiten it, treating garbage to vaporize organic matter and other contaminants which can then be recovered, if desired. Other toxic material such as PCB's and phenols could also be treated to break down these toxins into non-hazardous materials. Pulverization of rock can also be achieved, either in situ or as part of a continuous or batch process.

Liquids can be treated such as toxic chemicals, infected blood or milk needing sterilization. Precious metals can be dissociated from gangue with further recovery of constituents of the gangue material. Gravel material or the like can be scored to produce a rough surface for subsequent use as a better building aggregate. Wax coatings from rice husks could be removed to permit commercial use of the rice husks for building materials.

BRIEF DESCRIPTION OF THE DRAWINGS

Reference is now made to the drawings of the invention wherein.

DESCRIPTION OF THE PREFERRED EMBODIMENTS

Figure 1:
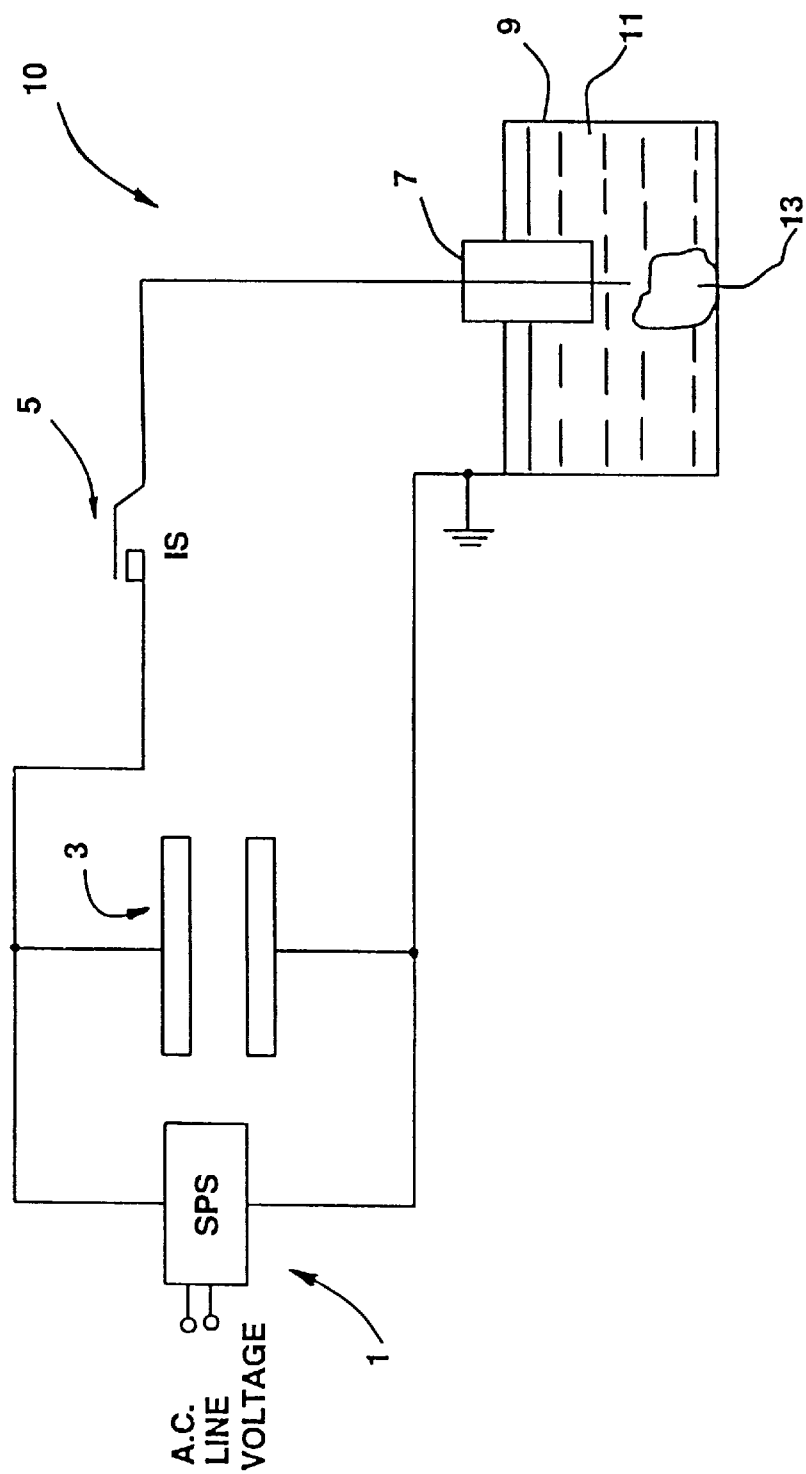
FIG. 1 is an exemplary schematic of embodiment of the apparatus of the present invention.

With reference now to FIG. 1, a first embodiment of the inventive apparatus is generally designated by the reference numeral 10 and is seen to include a switching power supply (SPS 1) which provides an electrical charge cumulatively to a capacitor 3. When sufficient voltage is created across the capacitor (voltage=charge/capacitance), an instantaneous high voltage switch 5 allows transfer of the charge held by the capacitor to a probe 7 which is disposed within an electrically grounded treatment reactor 9 filled with a medium 11 and a material 13 to be treated. As will be discussed below, the material to be treated could be a component part of the medium in the reactor 9. The medium/media can also be a liquid, solid or gas in conjunction with the material to be treated.

Voltage approaching 100 kilovolts can be developed across the capacitor 3, preferably sized between 0.05 and 2 microfarads, before it is operated to allow the charge to find its way to electrical ground via the interior of the treatment vessel 9 through the medium/media 11. Since the capacitor and the switching power supply is sized to provide up to 100 kilovolts to the capacitor in approximately one to eight seconds, the discharge of the capacitor could be as rapid as every two to three seconds to repeatedly treat the material 13 in the reactor 9.

Exemplary of a trigger device for the inventive apparatus is a high voltage spark gap switch Model No. 40-264 which is manufactured by Maxwell Corporation of San Diego, Calif. This switch has a voltage rating of 25 to 100 kilovolts with a maximum peak current of 100 kiloamps. Of course, other high energy trigger switches as are known in the art or equivalent to the Maxwell Corporation type described above can be used in the inventive apparatus. Similarly, high energy capacitors which are known can be utilized to release the voltage necessary to generate the cycle front as described above.

It is believed that during the near instantaneous dumping or release of the charge from the capacitor 3 via the switch 5 to the probe 7 and ground, several different phenomena occur in the reactor. For description purposes, the passage of the charge from the probe 7 to ground via the material to be treated is termed "a cycle" and the phenomena created by the charge release is termed "cycle front".

While not being bound by any exact theory for the phenomena which occurred during the cycle, it is believed that the cycle front technology can best be described as follows:

When electrical energy is suddenly released into a medium/media, intense mechanical-like shock waves are created. The wave is characterized by a steep leading edge and a minor bubble pulse trailing at its end. The cycle front or "electro-hydraulic effect" is an easy way to convert electrical energy into direct work. The duration of the discharge is in the range of one to hundreds of nanoseconds. Electrical cycle-front power, released by the discharge, reaches $10^3$–$10^5$ KW while the energy density into the discharge channel reaches $10^8$–$10^9$ J/M$^3$.

Complex physio-chemical phenomena are believed to occur in medium/media in the following steps:

a) formation of a conductivity channel,
b) widening of this channel,
c) post-discharge processes.

The breakdown starts by creating a few leaders, consisting of electrons and ions, leaders that are emitted mainly from a positive probe. The probe and/or the deflector insert can be machined to any configuration to suit the material which is to be treated. The leader stage ends when the gap bridging occurs, or when one of the leaders reaches the negative probe or ground, or when the two leaders meet. The breakdown time depends on voltage level, probe shape, and conductivity of the medium/media. Variations in the range of a few to hundreds of nanoseconds ($10^{-9}$ seconds) is typical.

After the medium/media gap has been bridged, the second stage of the electrical discharge starts. The larger part of stored energy is released here. When a substantial amount of energy is released in the cycle-front channel, a complicated gaseous system (discharge plasma) is created which, as a result of its parameters, is a dense low temperature plasma [temperature about $(1.5–4.0)\times10^4$ °K; pressure $(10–30)\times10^3$ atmospheres]. The discharge plasma within the medium/media converts circuit electrical energy into internal energy through a channel (heat movement, ionization, dissociation and excitation of particles), mechanical energy from shock waves (compression and motion of media elements) and electro-magnetic radiation.

Dumping a large amount of energy instantaneously into the small space of a cycle-front channel will raise its temperature and enlarge the channel. The surrounding media resists this intrusion. Therefore, discharging large amounts of energy into a medium/media momentarily causes high pressures which create standing shock waves. The shock waves act as a main power force of this technology. The instant the shock waves are created, their frontal pressure reaches tens of thousands of atmospheres which consists of neutrons that are responsible for the velocity becoming supersonic. Violent vibrations are caused which helps break up suspended matter.

After the circuit energy input stops, the discharge product expansion undergoes extensive cooling with a chain of internal conversions resulting in the creation of a steam-gas cavity within the medium/media. Internal and kinetic energy within the charged medium/media causes radical oscillation within the cavity. During the oscillation process, cavity-type pressure fluctuates considerably ($10^3$–$10^4$ times). After the cavity radius reaches its maximum, the pressure drops to a few millimeters of mercury and the cavity starts to collapse. The starting pressure in the cavity is about 40 atmospheres with the expansion speed of its walls around 40 meters per second and cavity lifetime is slightly higher than the discharge time.

Considering the cycle-front shock waves as the primary force and the cavity shock waves as secondary, the duration of the secondary wave is 30 to 45 times longer than the primary waves. The peak pressure and energy are 10 times lower but the pressure's impulse is of the same order.

Cycle-front discharges in medium/medias are accompanied by powerful cavitation processes. Of all the phenomena accompanying the electro-plasma treatment, the passing of intense acoustic waves in medium/media cavitation is the most known and, at the same time, the least studied physical process. Research of changes occurring in the microstructure during the cycle discharge showed that immediately following the discharge there are numerous gas bubbles in the medium/media. These bubbles occupied up to 15–20 percent of all medium/media volume surrounding the breakdown area, although after 1 to 3 minutes only 5 to 7 percent were left.

The cavitation process is accompanied by mechanical (shock waves), thermal (heating of cavity content as a result of a rapid shrinking) and electro-chemical effects on the cavitation medium/media and substance therein.

Capacitor operation in a "charge/discharge" mode requires a greater amount of time for energy storage than for energy release time. This makes it possible to obtain a time-based ($10^{-9}$) instantaneous discharge power in the megavolt range by using energy sources in the kilowatt range. The amount of energy released in a discharge channel depends on many factors, such as: the length of the working cycle-front; parameters of the discharge circuit (voltage, capacitance, inductance); area and shape of the probes; and properties of medium/media. Electrical efficiency of electroplasma devices range between 50 to 85 percent and can be adjusted in either direction by controlling discharge conditions within a certain mode. Exemplary parameters believed to occur during the cycle-front include:

Pressure $(10-30)\times 10^3$ atmosphere
Temperature $(1.5-4.0)\times 10^4$ °K
Light Wavelength 500–6,900 Å
Ultrasonics 300–1,500 Khz; 5–15 w/cm$^2$
Discharge Current 10–450 ka
Intensity $10^3-10^9$ j/cm$^2$
Duration $10^3-10^9$ seconds
Impact Waves Velocity 18,100 m/second.

The physical phenomenon that accompanies the cycle-front treatment of aqueous solutions can create such products as ozone, hydrogen peroxide, hydroxyl ions, which are great oxidants/reductors in many chemical reactions. Generation of hydrogen peroxide is beneficial when whitening materials.

For example, a high energy input will force and ionize an electron from a molecule of water ($H_2O-e->H_2O^+$) causing the following reaction to occur:

$H_2O->H+OH$;
$OH+OH->H_2O_2$;
$H+H->H_2$;
$2O->O_2$;
$H+O_2->HO_2$;
$OH+H_2->H_2O+H$;
$2H_2O->H_2O_2+H_2$;
$H_2O_2+OH->H_2O+HO_2$;
$O_2->O+O$;
$O+O_2->O_3$;
$H_2O_2+HO_2-H_2O+O_2+OH$ etc.

All the aforementioned cycle-front conditions take place within one to several nanoseconds.

Figure 2:
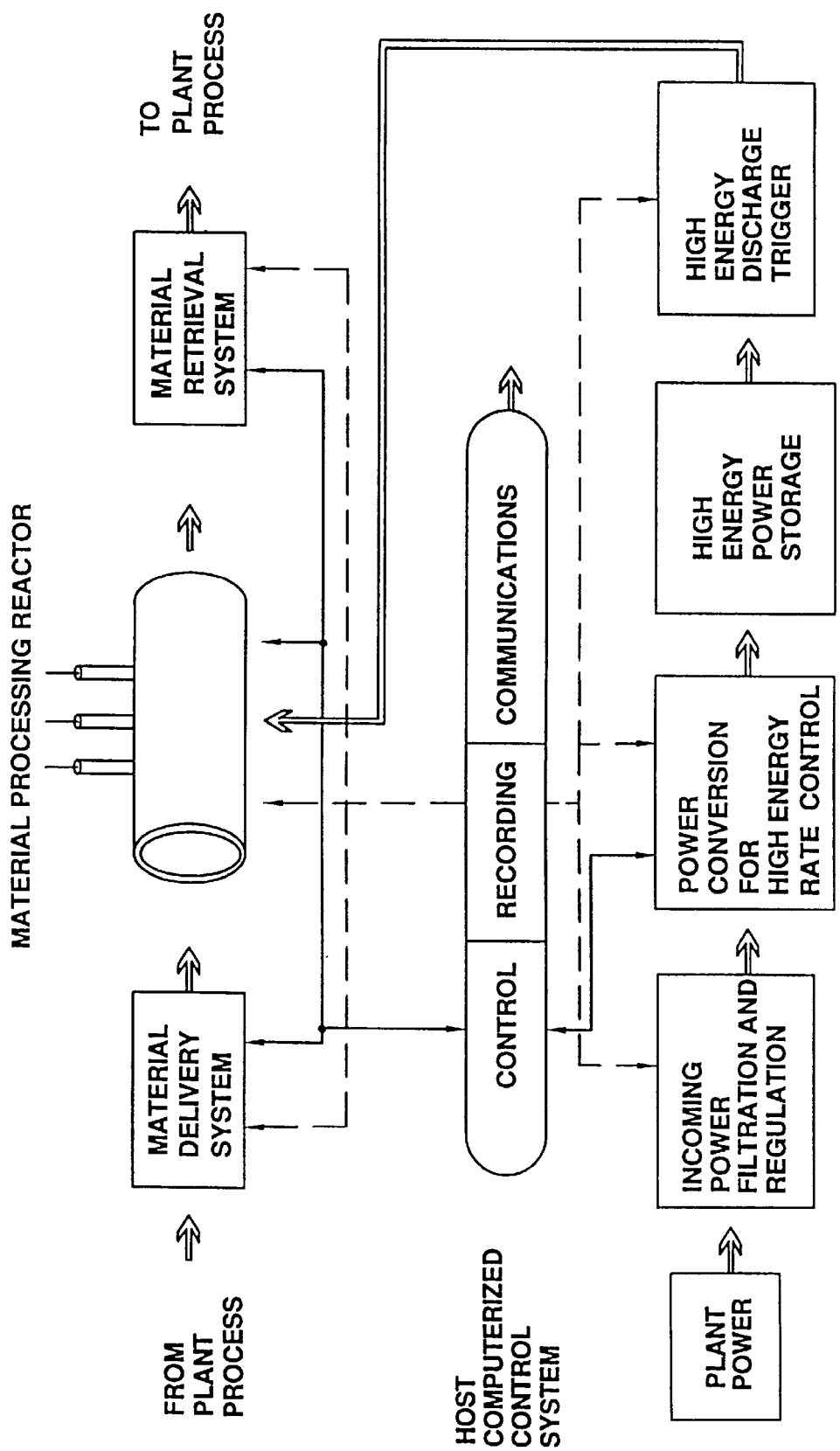
FIG. 2 is a schematic diagram of a system utilizing the inventive apparatus.

Although FIG. 1 depicts a batch operation where the material 13 is placed into the reactor 9 for processing, the inventive method and apparatus can also be used in a continuous operation as shown in FIG. 2. In FIG. 2, the system is disclosed having a continuous reactor designated by the reference numeral 15. Upstream of the reactor 20 is a material delivering system which feeds whatever material is to be processed. A material retrieval system is also provided downstream of the reactor 20. The system 15 is supplied with a power plant, power filter and regulation system, power conversion for higher energy rate control system, a high energy power storage capacitor as described above and a high energy discharge trigger as also described above. The power plant, power filter and regulation system are conventional and do not require further description for understanding of the invention.

The system can also include a computerized control system which monitors the power to the capacitor and trigger as well as the material delivery and retrieval systems. This control system also has capability for receiving and recording data from all components of the system as well as providing communications either in the form of the electronic data or printed data for record-keeping or the like.

Figure 3A:
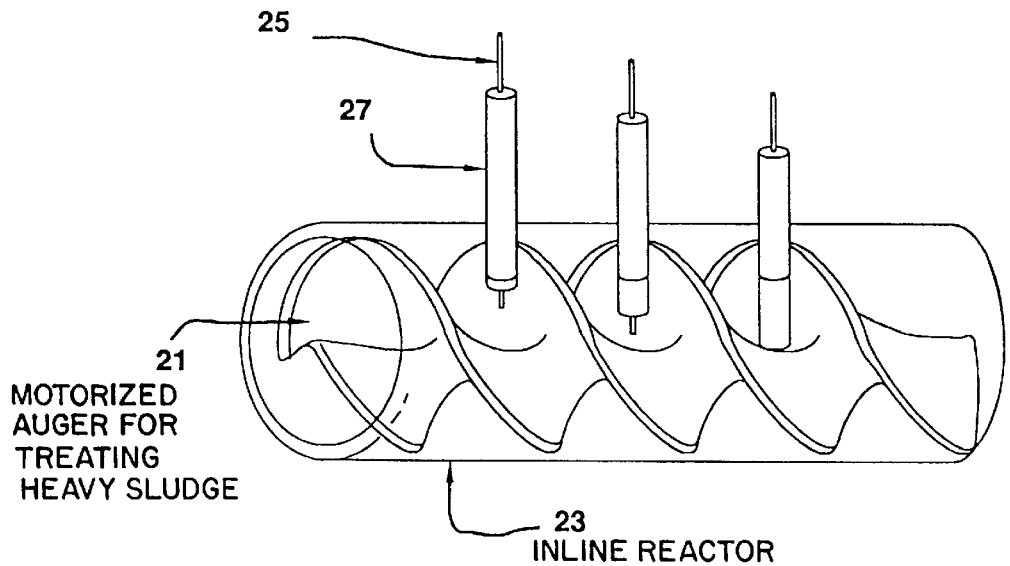
FIGS. 3a–3d show alternative embodiments of the apparatus depicted in FIG. 2.
Figure 3B:
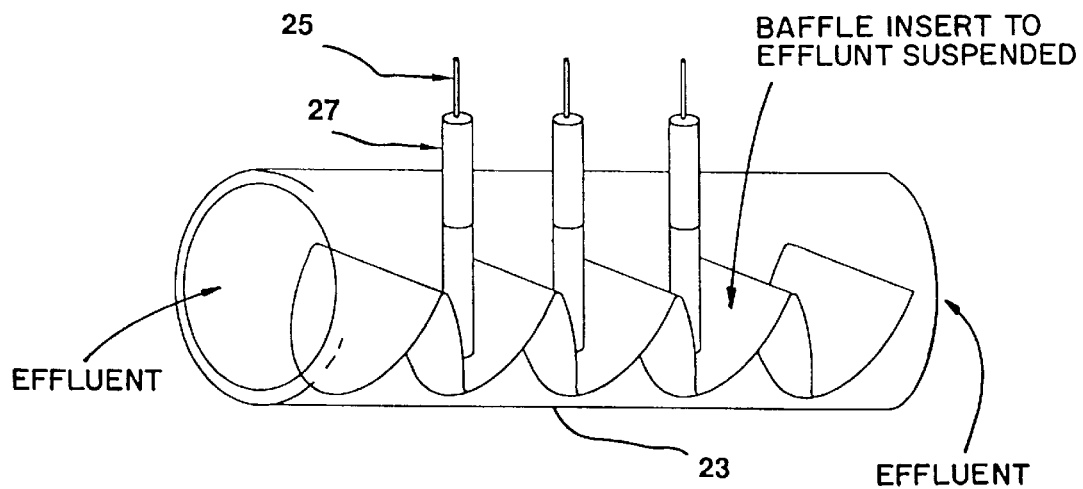

The reactor 20 is designed to handle a continuous flow of material to be processed thereto. Referring now to FIGS. 3a–3d, four exemplary embodiments of a continuous flow reactor are depicted. In FIG. 3a, a motorized auger 21 is disposed within the in line reactor chamber 23. A plurality of probes 25 are provided, each having an insulator 27. The probes can be equipped with a system for raising and lowering the probes in synchronization with travel of the auger 21, e.g. a hydraulic or electric drive or the like. In use, the auger 21 drives the material to be processed through the reactor 23 with the probes 25 firing for material treatment. In FIG. 3b, the reactor 23 is provided with a baffle which keeps the material suspended for cycle front processing.

Figure 3C:
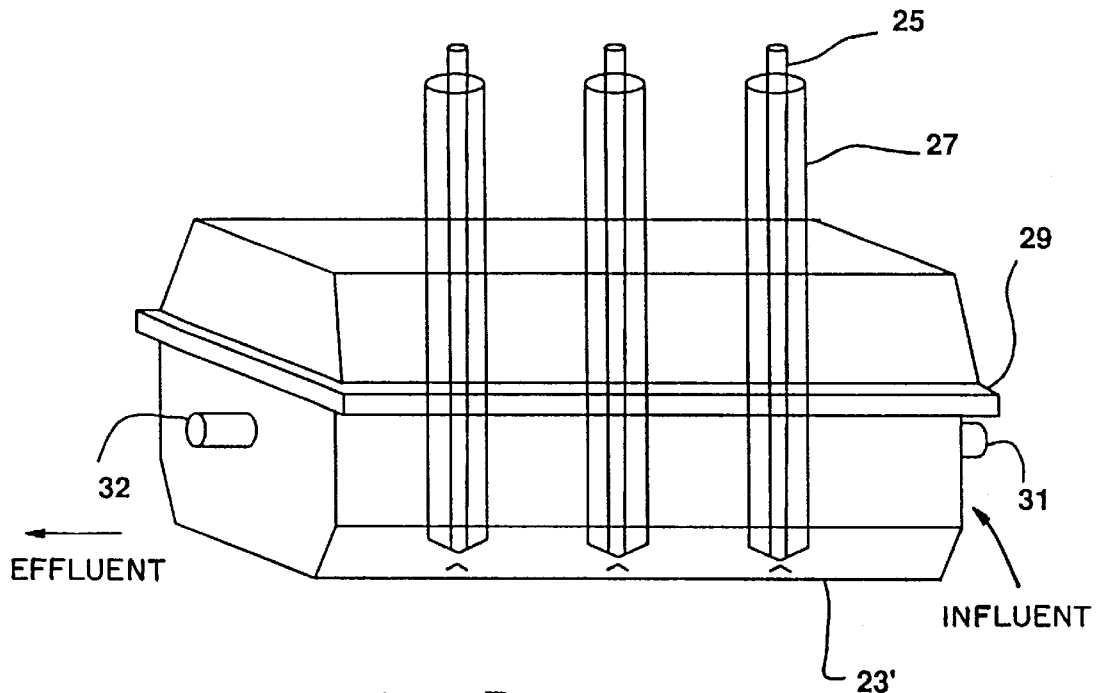

In FIG. 3c, a straight through reactor 23' is disclosed with removable cover 29, an inlet 31 and an outlet 32.

Figure 3D:
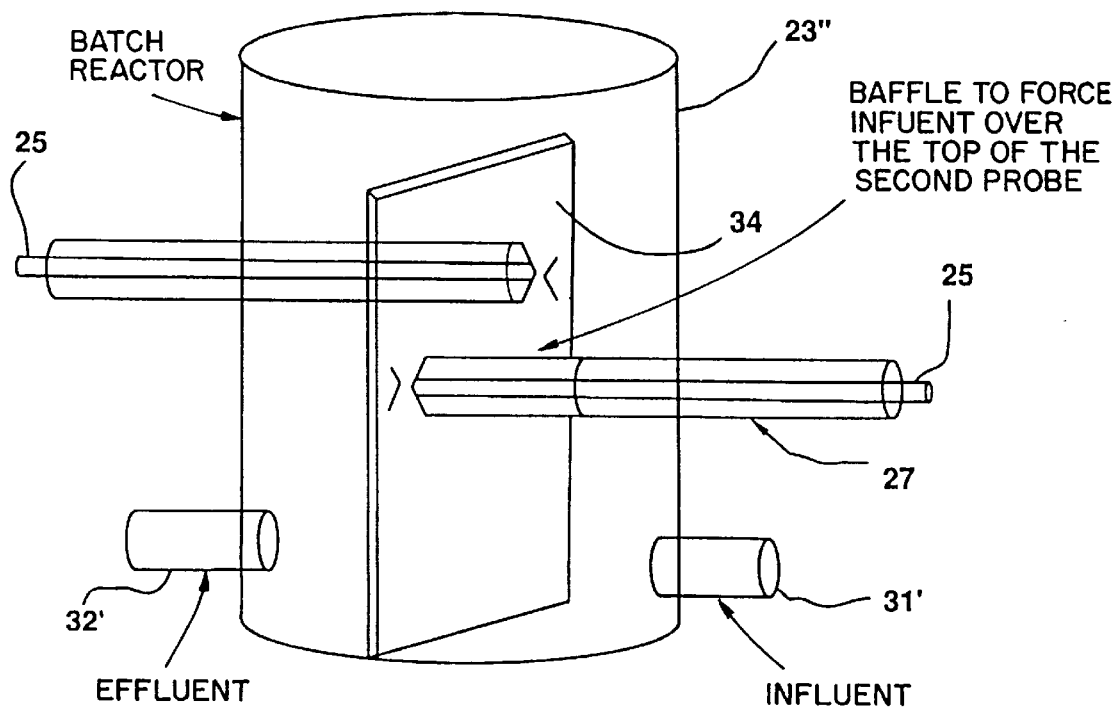

Referring to FIG. 3d, a reactor 23" is disclosed having an inlet 31' and outlet 32' with a baffle 34 disposed vertically therein. One probe 25' is disposed on one side of the baffle 34 with the other probe disposed on the other side. In this embodiment, the baffle 34 forces the influent over the top of the baffle to the second probe adjacent the outlet 32'. It should be understood that the embodiments in FIGS. 3a–3d are exemplary and other embodiments can be used to provide a continuous flow of the material to be treated by the inventive apparatus and method, including different types of material handling systems as well as probe designs and numbers of probes.

Figure 4:
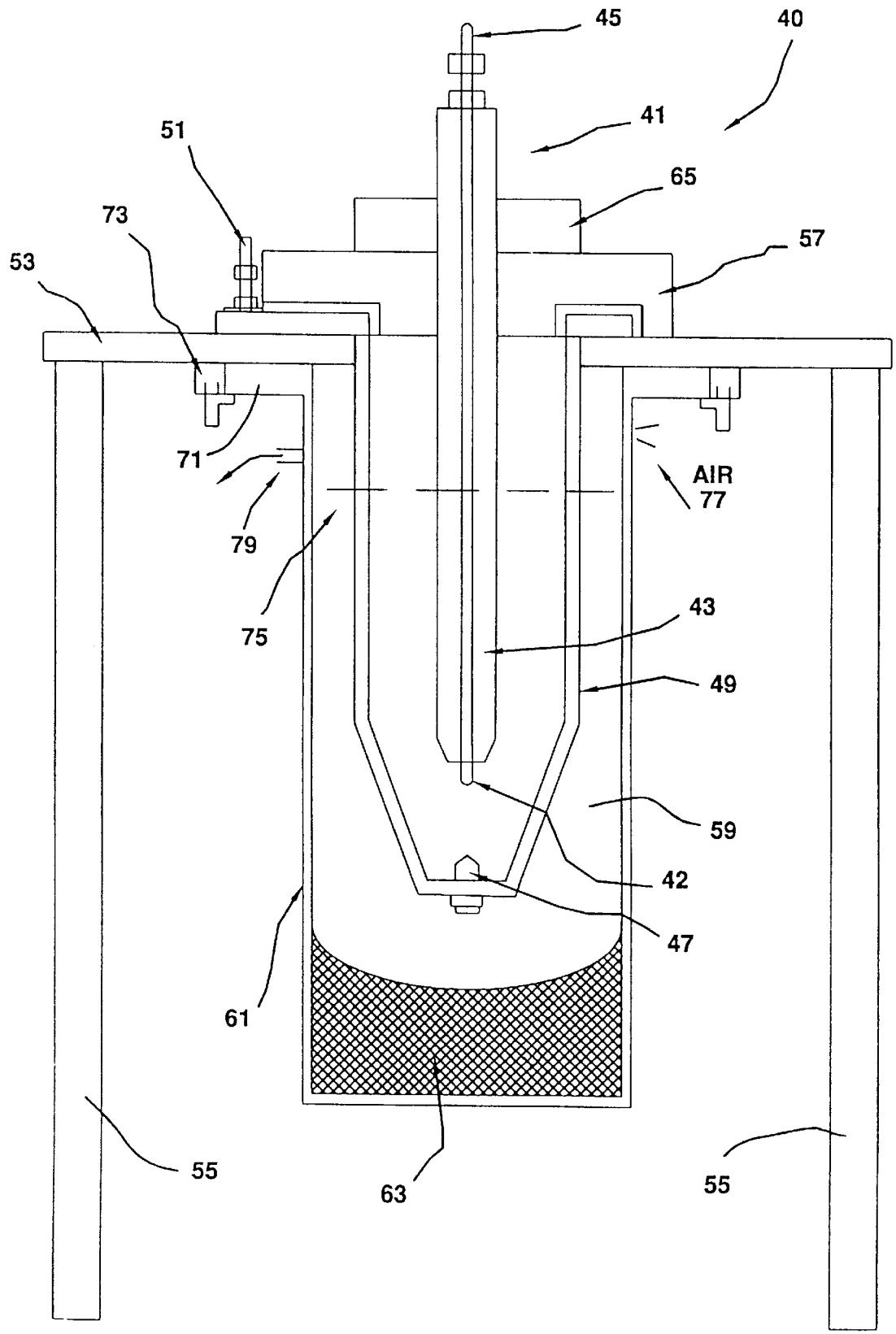
FIG. 4 is a schematic of a preferred probe assembly of the invention.

A more preferred reactor design is generally designated by the reference numeral 40 in FIG. 4. This reactor design includes a probe assembly 41 comprising a probe 42 and an insulator 43 surrounding the probe between ends thereof and a high voltage connector 45. Also provided is a ground tip 47 which is connected to ground via the ground connector bracket 49 and ground connector 51.

The ground connector bracket 49 and the probe assembly 41 are supported by the table top 53 and legs 55. The probe assembly 41 further includes a probe locator 57 which interfaces with the ground connector bracket 49 for positioning the probe assembly 41 within the reactor 59.

The reactor 59 is defined by reactor wall 61 and deflector insert 63. The reactor can have any cross-sectional shape but is preferably circular in cross-section. The deflector insert 63 is removable to facilitate treating different types of materials in the reactor 59. The deflector insert 63 can be removable by any conventional mode such as a threaded fit, pressure fit or the like.

The probe assembly 41 also includes an insulator and probe adjusting collar 65 which is fixed to the probe locator 57 and allows for adjustment of the distance between the probe and the ground tip 47. The spacing adjustment can be achieved by a threaded connection between the insulator 43 and the adjusting collar 65 or any other conventional adjusting mechanisms.

The reactor wall 61 include flanges 71 which interface with the reactor locator devices 73 extending from the underside of the table top 53.

FIG. 4 also depicts an exemplary medium level 75 in the reactor 59. Of course, this level can vary depending on the type of material to be treated within the reactor 40.

The design of the reactor 40 using the table top 53 and legs 55 enhances the ergonomics of the inventive process. By securing the probe assembly 41 and the ground connector bracket 49 to the table top 53, the probe can be set in place without the need for continued removal and subsequent calibrations.

With the reactor design 40, the reactor 59 is easily removable from the reactor locators 73. In this manner, the reactor merely has to be loaded with the appropriate medium and/or material to be treated and raised so that the probe and ground connector bracket are disposed therein. The reactor 59 then be locked onto the reactor locators by a twist action or any other conventional locking mechanism to secure the reactor 59 in place. The deflector insert 63 offers additional flexibility by its removability to alter the material to be treated by the inventive process.

The reactor 59 can also have an air inlet 77 and air outlet 79 to provide control over the atmosphere in the reactor disposed between the underside of the locator probe locator 57 and the surface of the medium 75. Air can be fed in continuous manner into the inlet 77 and out of the outlet 79 to vent any undesirable materials that may accumulate above the medium 75. Although air is depicted, inert gas such as argon, nitrogen or the like could also be used for gas flow purposes. Although not shown, the inlet and/or outlets 77 and 79 can include the appropriate on/off valves, flow control valve and an exhaust muffler on the outlet 79, if so desired.

The reactor 40 can be placed in a separate reactor room for additional personnel safety when practicing the inventive process.

Figure 5:
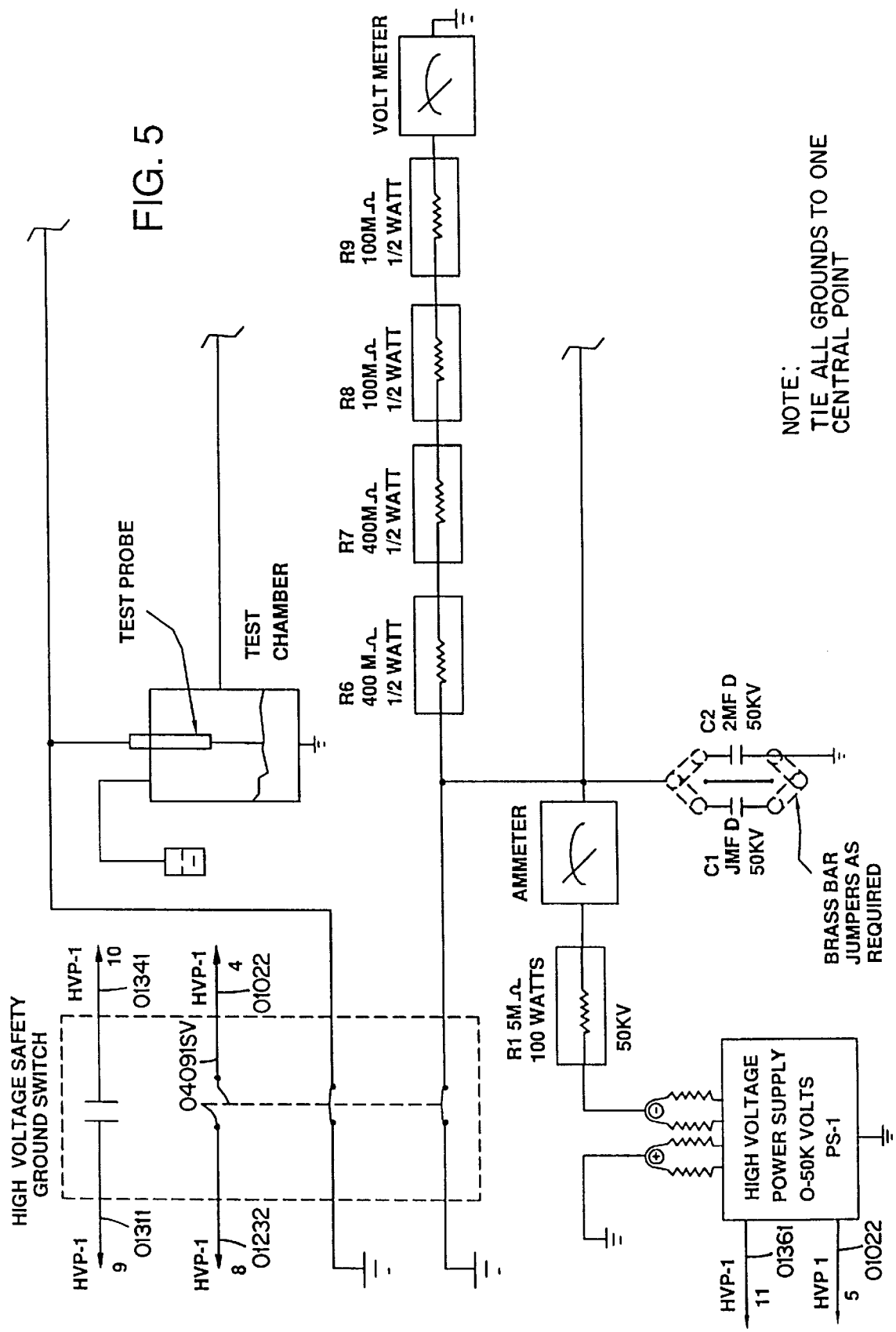
FIGS. 5 and 6 make up an exemplary circuit diagram.
Figure 6:
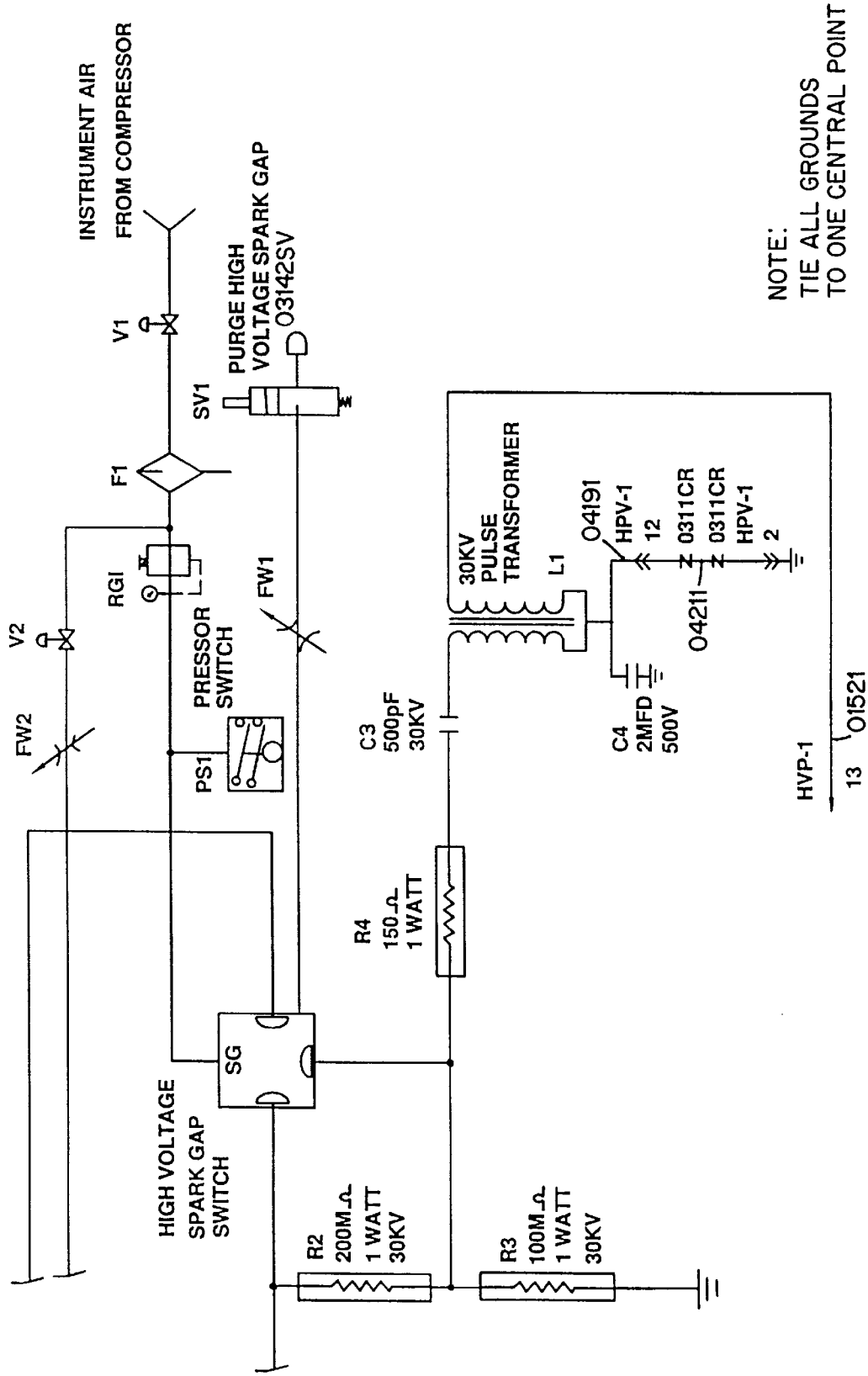

Referring now to FIG. 5, an exemplary circuit diagram is depicted. The circuit diagram provides further description concerning the components and circuitry described in FIG. 1 and describes a preferred embodiment of the invention. The circuit, generally designated by the reference numeral 80 begins with a high voltage power supply ranging from 0 to 50 kilovolts, designated as PS-1. This a conventional power supply and can use any of the standard supply voltages typically available, e.g., 110, 240 or 480 volts. Preferably, the primary side of the high voltage power supply receives 110 volts.

On the secondary side of the high voltage power supply is a ground switch designated by the reference numeral 81. The ground switch is designed as safety mechanism to discharge the probe in the test reactor as well as the high power circuitry. The ground switch 81 can be tripped automatically, for example, when the test reactor 9 is positioned in a reactor service area (not shown) and an operator or other worker enters the reactor service area. An auxiliary contact on the ground switch 81 interlocks the high voltage power supply primary source to assure that no recharge is attempted. The automatic tripping, although disclosed when operating personnel enter the reactor service area, can be configured for other safety purposes as will be known in the art.

Downstream of the ground switch is a 5 megaohm 100 watt resistor (R1) which controls the rate that the supply capacitors C1 and C2 are charged. An ammeter is disposed downstream of the resistor R1 to monitor the flow of current to the supply capacitor C1 and C2. The ammeter will show movement when high voltage power supply is supplying the capacitor C1 and C2.

The supply capacitors C1 and C2 are configured to accommodate a number of power requirements. The dotted lines on the top and bottom of the supply capacitors represent a movable bus connection to the ends of the capacitors. This will allow connection to the high voltage circuit and a number of series/parallel configurations which will permit testing different materials under different conditions.

A voltmeter is also supplied which is calibrated to monitor the charge supply of the supply capacitors C1 and C2. The resistors R6, R7, R8 and R9 upstream of the voltmeter are used to drop the current and voltages of the voltmeter. The resistors are only exemplary and other resistors could be used to allow the voltmeter to operate properly.

The high voltage spark gap switch SG is located downstream of the supply capacitors C1 and C2. The spark gap switch SG is a switch that controls the timing of the arc in the test reactor 9. The spark gap switch utilizes two control circuits for operation, i.e. an air control and a trigger circuit.

The air control includes a compressed air source from a compressor which is fed to the ball valve V1, filter F1 and regulator RG1. These components condition the air to be pressurized in the gap switch SG. A purge SV1 evacuates the spark gap switch between each cycle. Speed of the evacuation will be regulated with a flow valve FW1. The safety check is also incorporate in air circuit in the form of a pressure switch PS1. If the pressure switch is not made, i.e. meaning that the instrument air is not on, the high voltage power supply will not be able to operate.

The spark gap trigger circuit R2, R3, R4, C3, L1, C4 and 0311 CR, initiates the actual discharge of the power circuit. R2 and R3 supplied biasing voltage to the spark gap trigger switch. This voltage in itself is not enough to initiate the switch closure. The pulse transformer L1 converts 12 VDC from the main control cabinet to 30 KV. The pulse transformer output is held low with 0311 CR contacts. When the 0311 contacts are open via a control (not shown), the pulse transformer L1 will fire a 30 KV spike from C4 through C3 and R4 into the spark gap trigger switch. The spike combined with the biasing voltage from the high voltage power supply initiates the power circuit discharge into the test reactor 9.

The inventive apparatus and method are adapted to process a wide variety of materials for different end results. The electro-plasma technology utilized by the invention can be used to pulverize or shatter materials such as igneous rock, preferably a few cubic centimeters in volume. In investigating this phenomena, clear small fruit juice glass bottles were treated using the apparatus disclosed in FIG. 1. These bottles were smashed after only cycle. Further trials were conducted on bottles which were annealed to relieve any thermal stresses which may have been created during bottle manufacture by the bottles being cooled too quickly so as to generate stresses therein. The carefully annealed bottles were disintegrated in the same manner as the bottles which were not annealed.

In yet another trial, the bottles were subjected to a small number of cycles which smashed the bottles but did not achieve total pulverization thereof. It was noticed that the media, e.g., water, which was used in the treatment chamber along with the bottles did not increase substantially in temperature after the cycling. The particles of glass had smooth edges and were not sharp to the touch. This edge or surface smoothing, e.g., thermal polishing, is believed to be the result of the short-lived extremely high temperatures (believed to be 34,000° C. or higher) caused mainly by the hypersonic shock front.

During the trials above, the juice bottles were submerged in about 5 liters of tap water and subjected to an probe discharge of 30 kilovolts, producing about 80 joules of energy.

Fist-sized rocks were also shattered by subjecting them to discharges ranging from 30 to 50 kilovolts, these discharges producing about 480 joules of energy inside the reactor.

The inventive method and apparatus is also adapted for enhancing the growth of crops. In one study, seed corn was treated by subjecting the corn to a plurality of cycles. In one instance, 10.8 liters of water were used to treat 50 seeds with either 1, 3 or 5 cycles. A control was also provided which was not treated. After the treatment, the seeds were planted and the corn grew, thereby showing no adverse affect on the seed embryo due to the pretreatment.

In another study, treatment of seed corn demonstrated that the treated corn came to harvest three weeks earlier than non-treated corn. It is believed that the cycle front affects the seed embryo to lessen the harvest time. With this lessening of harvest time, a significant amount of corn can be grown for world population consumption. While these studies were used on corn seeds, it is believed that other germinating seeds such as wheat, soya and the like would also benefit from the inventive method and apparatus.

Additional studies were also conducted treating phenol which was dissolved in ordinary tap water. Repeated cycling of the phenol solution resulted in reduced concentrations of phenol thereby demonstrating that the hazardous material was dissociated into a non-hazardous material. It is believed that other material such as PCBs and other chlorinated and non-chlorinated hydrocarbons could also be successfully treated using the inventive method and apparatus.

The dissociation associated with the discharge of the high level of electrical energy stored in the capacitor results in a complete or partial breakdown or simplification of the treated material into a simpler constituent. For example, for phenol, the resisting benzene ring could be broken down into a simpler and non-hazardous chemical structure using the cycle front technology of the invention. Similarly, the force of the cycle front technology can be utilized to pulverize or reduce in size a solid material such as rock or the like. It is believed that the degree of dissociation for given material can be determined by varying the number of cycles or amount of electrical charge as would be within the skill of the art. For example, more cycles would be required to produce a more dissociative affect on a given material such as pulverizing a rock into a finely dispersed particulate matter.

The inventive apparatus and method offers the following significant improvements with regard to treating hazardous material.

I. Reduction of Biological Oxygen Demand
   destruction of toxic organic components
   lethal effect on bacteria (including spores)
II. Reduction of Chemical Oxygen Demand
   oxidants can be created during electrical discharge
III. Reduction of Suspended Solids
   ability to crush hard materials
   destruction of organic particles
IV. Handling highly contaminated waste streams
V. Continuous Processing
   reduced process time operates 24 hours a day
VI. Improved Reliability of Treatment
   simplified design, with continuous flow
   minimizes maintenance/downtime
VII. Reduced Capital Costs
   component machinery
   retro-fit in-line installation
   less space requirements
VIII. Lower Operating Costs
   no chemicals required
   operates automatically
   semi-skilled personnel may not be required
   adaptable to automatic monitoring and control
IX. Environmental Flexibility
   eliminates emergency overflow
   can be operated in a (closed) piping system or in a batch mode
   improved aesthetics in plant and at commercial, industrial sites (odorless and noiseless)
   minimal land use—can be installed at source of pollutants The cycle front technology is believed to have uses in wide range of materials and applications as described below.

SEEDS—The technology could enhance the growth of forests by several decades. In market seeds, such as corn, soya, and wheat, exciting the embryo could allow two crops per growing season as well as planting in areas hitherto considered unsafe because of the threat of early frost. In actual field tests, treated corn seeds had a three week advance growth during the fourth to fifth week.

PAPER PULP—The pulp could be whitened without the use of chlorine because the electro-plasma phenomenon radically changes the chemical structure of the medium temporarily forming hydrogen/peroxide which whitens the wood pulp. The peroxide dissipates within 48 to 72 hours.

SOLID WASTE—Non-separated garbage can be treated in extremely high temperatures (34,000° C.) which would vaporize organic matter into $CO_2$ and CO. Small traces of fluorine, chlorine, iodine, nitrogen and sulphur would result in respective acid vapors. These can be extracted, bottled and sold. Inorganic matter, composed of various metals and glasses, forms a metal silicate which can be recovered as a high-grade coke. This burns eight times hotter than standard coke. Temperatures are so high that complete combustion is obtainable. Little to no ash is produced.

LIQUID WASTE—The "electro-hydraulic effect" has the capacity to split atom-to-atom linkage of components, thus converting toxic chemicals into non-toxic.

HIV-INFECTED BLOOD—When subjected to various physical parameters, including impulses and pressures created by electro-plasma science, the virus will be killed. Then the HIV-free blood can be reintroduced into the same AIDS patient, thus acting as a vaccine.

PCBs and PHENOLS—Breaking the benzene ring would detoxify medium/media hazardous waste.

ZEBRA MUSSELS—Causing them to dissolve, thus cleaning them out of intake water pipes, then flushing them out into the lakes as fish food would solve another problem.

ROCK-CRUSHING—Pulverization of igneous, sedimentary and metamorphic rocks. Current rock crushing equipment is very expensive to buy and maintain. Practicing the invention can crush rock to produce a plant and fauna nutrient, inexpensive and chemical-free for a fraction of the cost.

ROCK FACES—In mining and in tunneling, The inventive rock-fracturing technology would eliminate the use of dangerous explosives. In this mode, the spark probe could be configured using the rock itself as reactor containment.

PRECIOUS METALS—These metals can be disassociated from gangue. While performing that operation, any cyanide or arsenic that might still be present in the gangue could be broken down and rendered harmless.

PEA GRAVEL—Scoring its smooth surfaces, so that it will bond better to cement, would give concrete ten times its normal tensile strength for use on road surfaces and in concrete overpasses.

NUCLEAR WASTE CONTAINMENT—Using treated pea gravel in the construction of nuclear waste caskets will make them approximately ten times more impermeable when nuclear waste rods are stored.

MILK—Use of the electro-plasma process can enable milk to retain up to 87% of its nutrients, an improvement on pasteurization which destroys up to 55%.

RICE HUSKS—If the wax coating were removed from each husk by practicing the invention, rice husks could be used to make building materials, such as chipboard.

As such, an invention has been disclosed in terms of preferred embodiments thereof which fulfill each and every one of the objects of the present invention as set forth hereinabove and provides a new and improved apparatus utilizing high energy electrical discharge for solid and medium/media material processing and a method of use.

Of course, various changes, modifications and alterations from the teaching of the present invention may be contemplated by those skilled in the art without departing from the intended spirit and scope thereof. Accordingly, it is intended that the present invention only be limited by the terms of the appended claims.

What is claimed is:

1. A method of dissociating a material in a media comprising the steps of:
   a) providing a solid material to be dissociated;
   b) providing a medium/media-containing reactor with the material therein;
   c) subjecting said material to at least one cycle of a release of an electrical charge in a time span on an order of a nanosecond to impact a cycle shock front to the material for dissociation whereby the dissociation causes one of vaporization of the solid material, disintegration of the solid material and a smoothing of the surface of the solid material; and
   d) recovering at least one of said medium/media and at least one dissociated product from said subjecting step.

2. The method of claim 1 wherein said subjecting step further comprises providing:
   i) a power supply;
   ii) a capacitor for storing an electrical charge supplied from the power supply;
   iii) a trigger switch means for discharging the electrical charge stored in the capacitor in said time span;
   iv) at least one probe, one end connected to the trigger switch for receiving the electrical charge discharged by the trigger switch, the other end releasing the electrical charge; and
   v) a reactor having the medium/media therein, the other end of the probe immersed in the medium/media; and
   vi) wherein the material is placed in the reactor and is subjected to the released electrical charge for dissociation.

3. The method of claim 1 wherein the material is a solid material and the dissociation causes one of vaporization of the solid material, disintegration of the solid material, dissolution of the solid material and a smoothing of a surface of the solid material.

4. The method of claim 1 wherein the material is a component part of the medium/media.

5. The method of claim 1 wherein the solid material is rock and the rock is disintegrated.

6. The method of claim 1 wherein the material is zebra mussels and the zebra mussels are dissolved.

7. The method of claim 1 wherein the material is pea gravel and a surface of the pea gravel is roughened during dissociation.

8. The method of claim 1 wherein the material is garbage and at least a portion of the garbage is vaporized.

9. A method of dissociating a material in a media comprising the steps of:
   a) providing a material selected from the group consisting of paper fiber and rice husks having a wax coating, and precious metal-bearing gangue to be dissociated;
   b) providing a medium/media-containing reactor with the material therein;
   c) subjecting said material to at least one cycle of a release of an electrical charge in a time span on an order of a nanosecond to impact a cycle shock front to the material for dissociation; and
   d) recovering at least one of said medium/media and at least one dissociated product from said subjecting step.

10. The method of claim 9 wherein said subjecting step further comprises providing:
    i) a power supply;
    ii) a capacitor for storing an electrical charge supplied from the power supply;
    iii) a trigger switch means for discharging the electrical charge stored in the capacitor in said time span;
    iv) at least one probe, one end connected to the trigger switch for receiving the electrical charge discharged by the trigger switch, the other end releasing the electrical charge; and
    v) a reactor having the medium/media therein, the other end of the probe immersed in the medium/media; and
    vi) wherein the material is placed in the reactor and is subjected to the released electrical charge for dissociation.

11. A method of dissociating a material in a media comprising the steps of:
    a) providing a material to be dissociated;
    b) providing a medium/media-containing reactor with the material therein, wherein the medium/media is selected from the group consisting of blood and milk and the material is a virus when blood is selected and bacteria when milk is selected;
    c) subjecting said material to at least one cycle of a release of an electrical charge in a time span on an order of a nanosecond to impact a cycle shock front to the material for dissociation; and
    d) recovering at least one of said medium/media from said subjecting step.

12. The method of claim 11, wherein said subjecting step further comprises providing:
    i) a power supply;
    ii) a capacitor for storing an electrical charge supplied from the power supply;
    iii) a trigger switch means for discharging the electrical charge stored in the capacitor in said time span;
    iv) at least one probe, one end connected to the trigger switch for receiving the electrical charge discharge by the trigger switch, the other end releasing the electrical charge; and
    v) a reactor having the medium/media therein, the other end of the probe immersed in the medium/media; and
    vi) wherein the material is placed in the reactor and is subjected to the released electrical charge for dissociation.

* * * * *